US012621263B2

(12) United States Patent     (10) Patent No.:   US 12,621,263 B2

Nakane       (45) Date of Patent:     May 5, 2026

(54) IMAGE FORMING APPARATUS CAPABLE OF NOTIFYING USER OF ERROR CAUSED DUE TO ZT MODE, METHOD OF CONTROLLING IMAGE FORMING APPARATUS, AND STORAGE MEDIUM

(71) Applicant: CANON KABUSHIKI KAISHA, Tokyo (JP)

(72) Inventor: Hiroyuki Nakane, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 346 days.

(21) Appl. No.: 17/719,509

(22) Filed: Apr. 13, 2022

(65) Prior Publication Data

US 2022/0342616 A1     Oct. 27, 2022

(30) Foreign Application Priority Data

Apr. 26, 2021    (JP) ................................. 2021-074063

(51) Int. Cl.
*H04L 9/40*        (2022.01)

(52) U.S. Cl.
CPC ................................. *H04L 63/0236* (2013.01)

(58) Field of Classification Search
CPC ... H04L 63/0236; G06F 21/57; G06F 3/1203; G06F 3/1239; G06F 3/1285; G06F 21/608; Y02D 10/00
See application file for complete search history.

(56) References Cited

U.S. PATENT DOCUMENTS

| | | | |
|---|---|---|---|
| 9,384,434 B2 | 7/2016 | Adachi | |
| 9,405,255 B2 * | 8/2016 | Oguma | G03G 15/5091 |
| 10,257,377 B2 * | 4/2019 | Ito | H04N 1/00896 |
| 2004/0073696 A1 * | 4/2004 | Kim | G06Q 10/087 709/219 |
| 2004/0156069 A1 * | 8/2004 | Kurotsu | G06F 3/1211 358/1.15 |
| 2004/0160631 A1 * | 8/2004 | Schlonski | H04N 1/00278 358/1.15 |
| 2004/0236862 A1 * | 11/2004 | Ito | H04N 1/32529 709/217 |
| 2006/0274355 A1 * | 12/2006 | Ferlitsch | G06K 15/02 358/1.14 |

(Continued)

FOREIGN PATENT DOCUMENTS

JP      2015003407 A     1/2015

*Primary Examiner* — Daniel B Potratz
*Assistant Examiner* — Matthias Habtegeorgis
(74) *Attorney, Agent, or Firm* — ROSSI, KIMMS & McDOWELL LLP

(57)        ABSTRACT

An image forming apparatus capable of notifying a user that an error is caused due to a ZT mode. The image forming apparatus includes a plurality of network ports that are capable of receiving job data. When the image forming apparatus receives a request for shifting the image forming apparatus to the ZT mode for limiting a communicable network port to a predetermined network port of the plurality of network ports, out of the plurality of network ports, the network ports other than the predetermined network port are blocked. The other network ports having been blocked are opened, and when any of the opened other network port receives the job data, a code indicating that a job is terminated in an error due to the ZT mode is output and notified to a user.

5 Claims, 13 Drawing Sheets

(56) References Cited

U.S. PATENT DOCUMENTS

2007/0097416 A1*  5/2007  Higashimura ........ G06F 3/1285
                                                        358/1.15
2008/0049246 A1*  2/2008  Kim ................... H04N 1/00233
                                                        358/1.15
2009/0009796 A1*  1/2009  Park .................. H04N 1/00204
                                                        358/1.15
2009/0204857 A1*  8/2009  Yokokura ........... H04L 43/0817
                                                        714/48
2011/0307642 A1* 12/2011  Yamasaki ............... G06F 21/85
                                                        710/313
2012/0030690 A1*  2/2012  Kakitsuba ............ G06F 3/1257
                                                        719/327
2013/0055035 A1*  2/2013  Nakatsu ............. G06F 11/0733
                                                        714/48
2013/0141753 A1*  6/2013  Kamoi ................ H04N 1/4413
                                                        358/1.14

2014/0013156 A1*  1/2014  Cho .................... G06F 11/0733
                                                        714/30
2014/0085309 A1*  3/2014  Czapar ................... G06F 3/147
                                                        345/441
2016/0054965 A1*  2/2016  Tanji ................. H04N 1/00307
                                                        358/1.13
2017/0026549 A1*  1/2017  Masuda ............... H04N 1/0023
2017/0123736 A1*  5/2017  Park ...................... G06F 3/1234
2018/0017914 A1*  1/2018  Hikichi ................. G03G 15/80
2018/0167531 A1*  6/2018  Nomura ................. G06F 13/24
2021/0007160 A1*  1/2021  Sivasiva Ganesan .......................
                                                        H04W 8/005
2022/0214840 A1*  7/2022  Urakawa ............... G06F 3/1258
2022/0279083 A1*  9/2022  Kakutani ........... H04N 1/00877
2022/0294917 A1*  9/2022  Yamasaki ............ G06F 3/1229
2023/0315876 A1* 10/2023  Sirigiri ................. G06F 3/1272
                                                        726/26

* cited by examiner

*FIG. 8*

| LEVEL | AVAILABLE PRINT APPLICATION | ASSOCIATED NETWORK PORT |
|---|---|---|
| 1 | IPP PRINT APPLICATION 1 | HTTPS, IPP |
| | IPPS PRINT APPLICATION 1 | HTTPS, IPPS |
| | CLOUD PRINT APPLICATION 1 | HTTPS |
| | ... | |
| 2 | FORCED RESERVE PRINT | HTTPS, RAW |
| | ON-PREMISE PRINT APPLICATION 1 | HTTPS, RAW |
| | ... | |
| 3 | DIRECT PRINT | HTTP, LPD |
| | PDL DRIVER PRINT | RAW |
| | ... | |
| 4 | USBD PRINT | ---- |
| | USB MEDIUM PRINT | ---- |
| | ... | |

*FIG. 11*

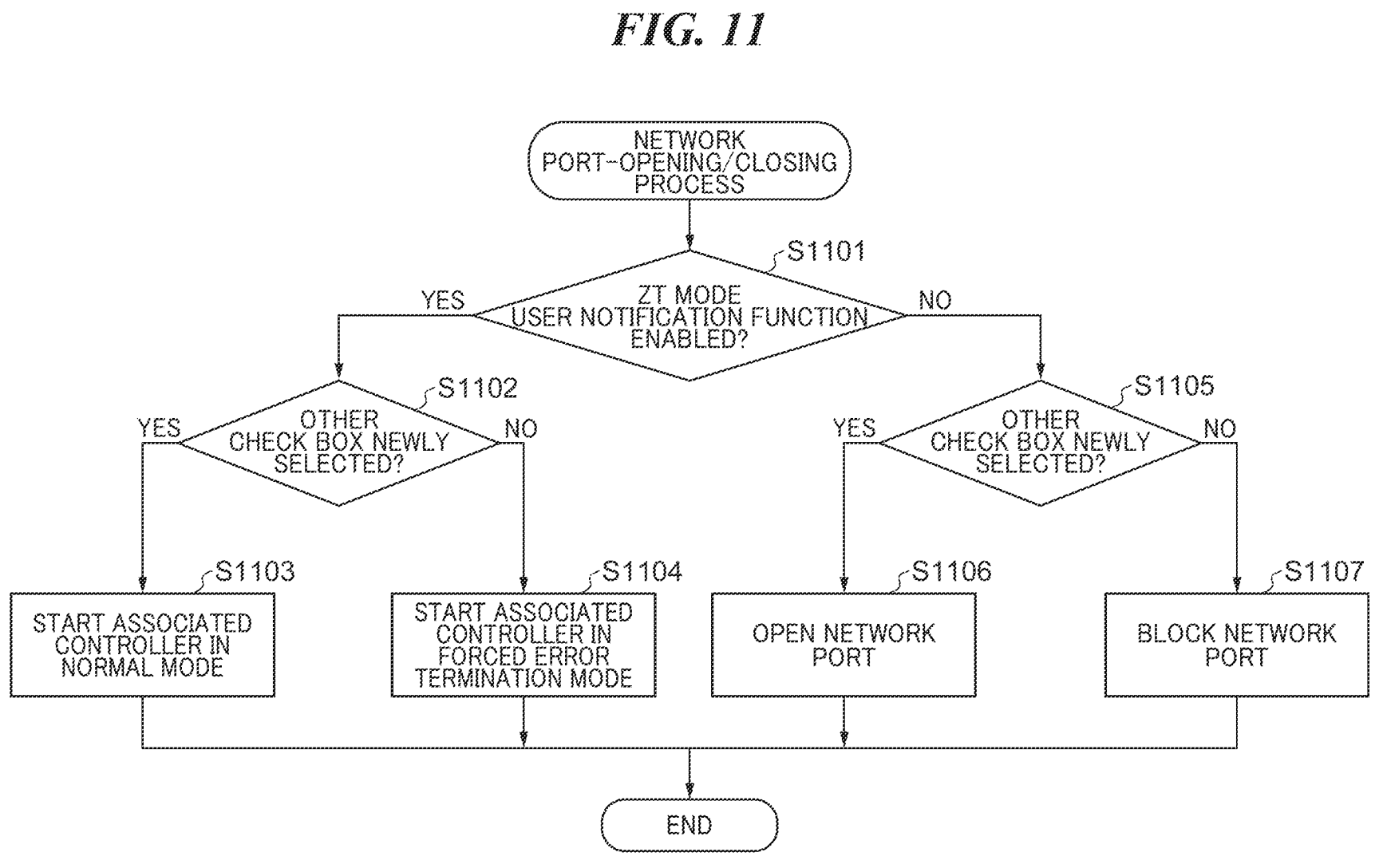

NETWORK
PORT-OPENING/CLOSING
PROCESS

S1101

ZT MODE
USER NOTIFICATION FUNCTION
ENABLED?

YES

S1102

OTHER
CHECK BOX NEWLY
SELECTED?

YES

S1103

START ASSOCIATED
CONTROLLER IN
NORMAL MODE

NO

S1104

START ASSOCIATED
CONTROLLER IN FORCED ERROR
TERMINATION MODE

NO

S1105

OTHER
CHECK BOX NEWLY
SELECTED?

YES

S1106

OPEN NETWORK
PORT

NO

S1107

BLOCK NETWORK
PORT

END

IMAGE FORMING APPARATUS CAPABLE OF NOTIFYING USER OF ERROR CAUSED DUE TO ZT MODE, METHOD OF CONTROLLING IMAGE FORMING APPARATUS, AND STORAGE MEDIUM

BACKGROUND OF THE INVENTION

Field of the Invention

The present invention relates to an image forming apparatus that is capable of notifying a user of an error caused due to a ZT mode, a method of controlling the image forming apparatus, and a storage medium.

Description of the Related Art

A technique disclosed in Japanese Laid-Open Patent Publication (Kokai) No. 2015-3407 determines a security policy in advance and verifies whether or not an input job matches the security policy. In a case where an input job does not match the security policy, execution of the input job is restricted. In such a configuration that verifies whether or not an input job matches the security policy, even in a case where job data for executing a job is transmitted via a non-secure path, the image forming apparatus is required to once take the job data into the image forming apparatus, which involves security risk.

SUMMARY OF THE INVENTION

The present invention provides an image forming apparatus that is capable of notifying a user that an error is caused due to a ZT mode, a method of controlling the image forming apparatus, and a storage medium.

In a first aspect of the present invention, there is provided an image forming apparatus, including a plurality of network ports that are capable of receiving job data, at least one processor, and a memory coupled to the at least one processor, the memory having instructions that, when executed by the processor, perform the operations as: a reception unit configured to receive a request for shifting the image forming apparatus to a predetermined operation mode for limiting a communicable network port to a predetermined network port of the plurality of network ports, a blocking control unit configured to block, out of the plurality of network ports, network ports other than the predetermined network port, upon receipt of the request for shifting the image forming apparatus to the predetermined operation mode, an opening control unit configured to open the other network ports which have been blocked, an output unit configured to output a code indicating that a job is terminated in an error due to the predetermined operation mode when any of the opened other network port receives the job data, and a notification unit configured to notify a user of the code.

In a second aspect of the present invention, there is provided a method of controlling an image forming apparatus including a plurality of network ports that are capable of receiving job data, comprising receiving a request for shifting the image forming apparatus to a predetermined operation mode for limiting a communicable network port to a predetermined network port of the plurality of network ports, closing, out of the plurality of network ports, network ports other than the predetermined network port, upon receipt of the request for shifting the image forming apparatus to the predetermined operation mode, opening the other network ports which have been blocked, outputting a code indicating that a job is terminated in an error due to the predetermined operation mode when any of the opened other network port receives the job data, and notifying a user of the code.

According to the present invention, it is possible to notify a user that an error is caused due to a ZT mode.

Further features of the present invention will become apparent from the following description of exemplary embodiments (with reference to the attached drawings).

BRIEF DESCRIPTION OF THE DRAWINGS

FIG. 8 is a table showing a list of print applications which are available in the MFP appearing in FIG. 1.

FIG. 11 is a flowchart of a network port-opening/closing process performed in a step in FIG. 9.

DESCRIPTION OF THE EMBODIMENTS

The present invention will now be described in detail below with reference to the accompanying drawings showing embodiments thereof.

Conventionally, boundary-type protection security, such as a method of monitoring the boundary between an in-office network and an external network using e.g. firewall, has been mainly used. However, in recent years, teleworking has become popular and the working environment has been dispersed. This makes it difficult to monitor the boundary and impossible to sufficiently ensure the security by the boundary-type protection security. For this reason, as a new security measure, Zero Trust is attracting attention. In Zero Trust, security control is performed without trusting any access, even an access from an internal network, not to mention an access from an external network, and an image forming is also required to be adapted to a user environment equipped with Zero Trust protection.

On the other hand, there has been developed an image forming apparatus equipped with a mode in which communication with an external site which is without the firewall and may be under threat is forcibly blocked (hereinafter referred to as the "ZT mode"). In a case where an image forming apparatus including a plurality of network ports is in the ZT mode, a communicable network port is limited only to a predetermined network port which has been permitted to be used, in advance, and the other network ports are blocked. This makes it possible to inhibit communication with any external site which is without the firewall and can be under threat.

However, a problem is sometimes caused when a user operates a communication apparatus to thereby transmit job data to an image forming apparatus set to the ZT mode. For example, in a case where the user who does not know that the image forming apparatus has been set to the ZT mode sets a network port which is not permitted to be used as a transmission destination of the job data, the image forming apparatus cannot receive the job data because the designated network port is blocked. In this case, the image forming apparatus is not only incapable of executing the job, but also incapable of outputting an error notification, and hence the user cannot identify the cause of non-execution of the job.

An embodiment of the present invention will now be described in detail below with reference to the accompanying drawings. Note that although in the present embodiment, the description is given of a case where the present invention is applied to a multifunction peripheral (hereinafter referred to as the "MFP") as an image forming apparatus equipped with a network cooperation function, the present invention is not limited to this configuration. For example, the present invention may be applied e.g. to an SFP equipped with the network cooperation function. Note that the MFP is an abbreviated form of multi-function peripheral. The SFP is an abbreviated form of single function peripheral.

Figure 1:
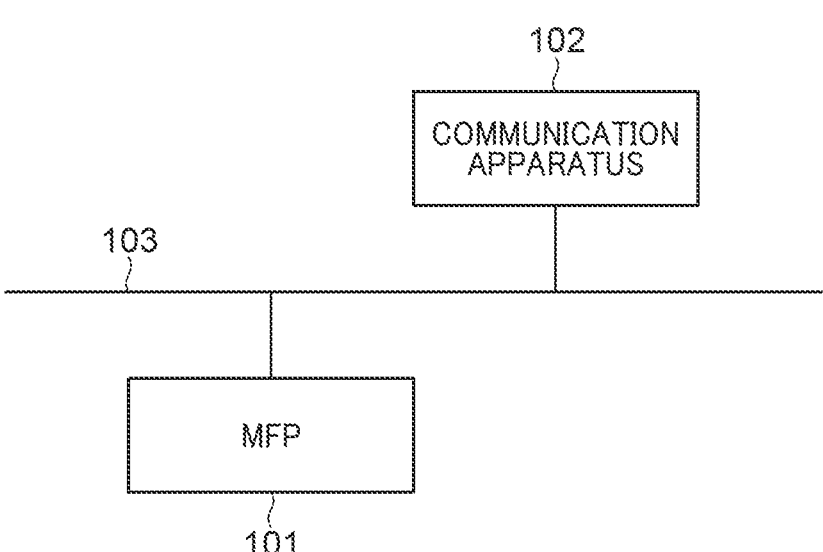
FIG. 1 is a diagram of the network configuration of an MFP as an image forming apparatus according to an embodiment of the present invention.

FIG. 1 is a diagram of the network configuration of an MFP 101 as the image forming apparatus according to the embodiment of the present invention. Referring to FIG. 1, the MFP 101 is connected to a communication apparatus 102 via a network 103. Note that although in the present embodiment, the description is given of the configuration in which the MFP 101 is connected to one communication apparatus 102 via the network 103, this is not limitative. For example, the MFP 101 may be connected to a plurality of communication apparatuses and a plurality of MFPs via the network 103. The MFP 101 is equipped with a plurality of functions, such as a print function, a scan function, a communication function, and a network cooperation function. For example, the MFP 101 transmits image data generated by reading a document to the communication apparatus 102, and further, receives print data to be printed from the communication apparatus 102.

Figure 2:
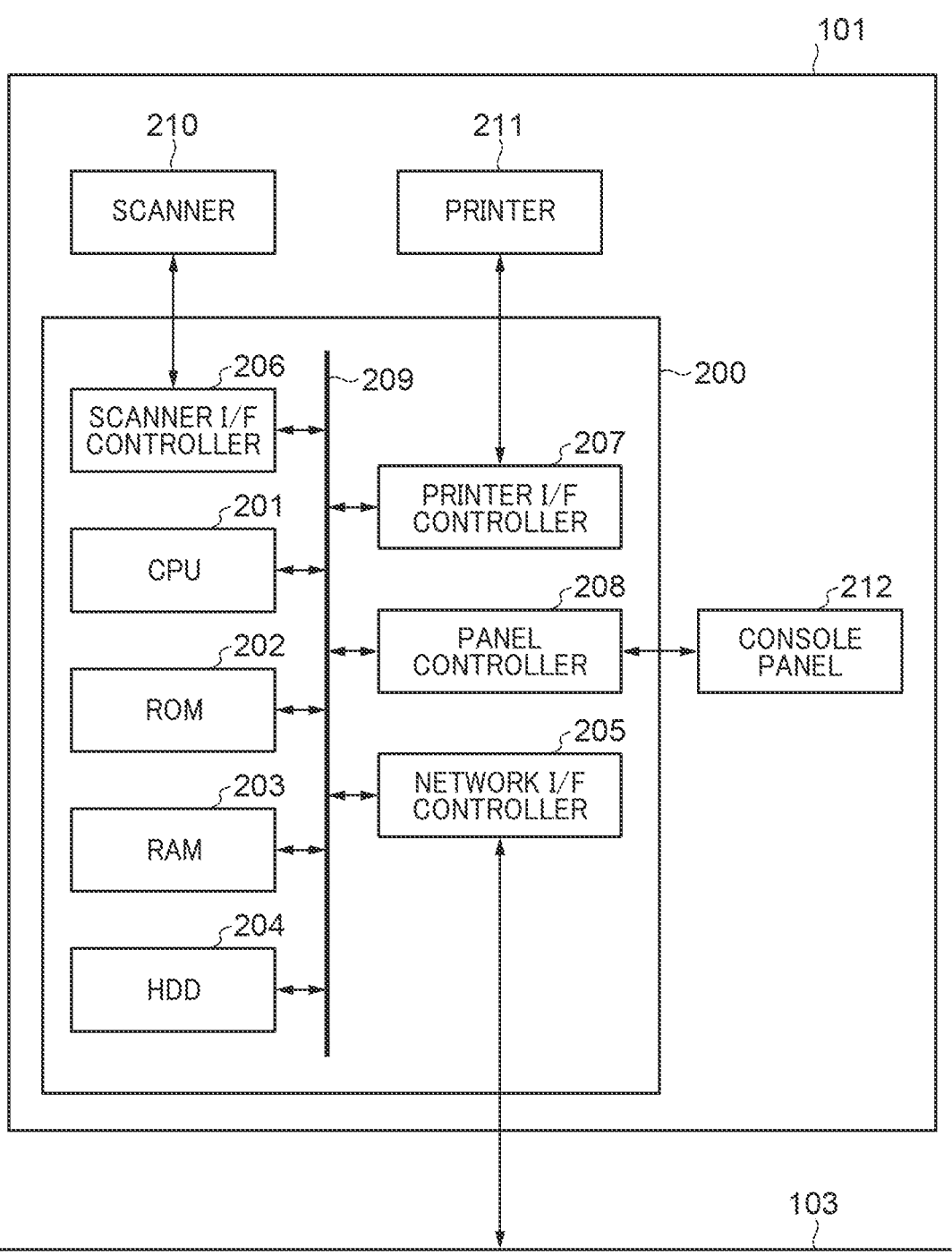
FIG. 2 is a schematic block diagram of the MFP appearing in FIG. 1.

FIG. 2 is a schematic block diagram of the MFP 101 appearing in FIG. 1. Referring to FIG. 2, the MFP 101 includes a controller 200, a scanner 210, a printer 211, and a console panel 212. The controller 200 is connected to the scanner 210, the printer 211, and the console panel 212.

The controller 200 includes a CPU 201, a ROM 202, a RAM 203, an HDD 204, a network interface controller 205, a scanner interface controller 206, a printer interface controller 207, and a panel controller 208. The CPU 201, the ROM 202, the RAM 203, the HDD 204, the network interface controller 205, the scanner interface controller 206, the printer interface controller 207, and the panel controller 208 are interconnected via a bus 209.

The CPU 201 controls the overall operation of the MFP 101 by executing software programs of the MFP 101. The ROM 202 is a read only memory that stores a boot program, fixed parameters, and so forth, for the MFP 101. The RAM 203 is a random access memory that is used as an area for temporarily storing programs and a variety of data when the CPU 201 controls the MFP 101. The HDD 204 is a hard disk drive that stores system software, applications, and a variety of data. The CPU 201 controls the operation of the MFP 101 by executing the boot program stored in the ROM 202 and executing the programs stored in the HDD 204 and loaded into the RAM 203. The network interface controller 205 controls data communication with the communication apparatus 102 and the like connected to the network 103. The scanner interface controller 206 controls the scanner 210 to perform processing for reading a document. The printer interface controller 207 controls the printer 211 to perform print processing and the like. The panel controller 208 controls the touch panel-type console panel 212. For example, the panel controller 208 displays a variety of information on the console panel 212 and further, acquires an instruction and the like input to the console panel 212 by a user from the console panel 212.

Figure 3:
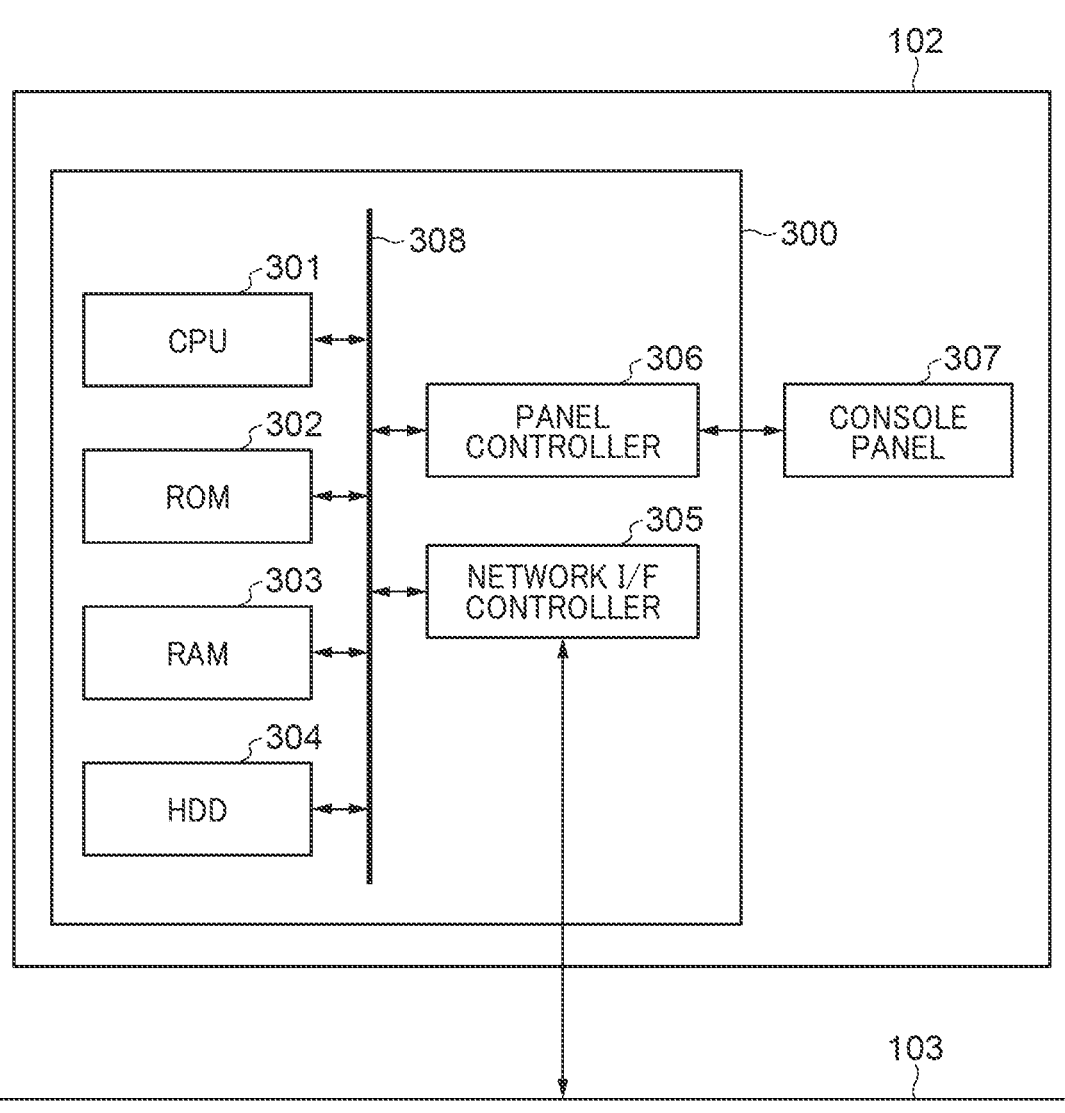
FIG. 3 is a schematic block diagram of a communication apparatus appearing in FIG. 1.

FIG. 3 is a schematic block diagram of the communication apparatus 102 appearing in FIG. 1. In FIG. 3, the communication apparatus 102 includes a controller 300 and a console panel 307. The controller 300 is connected to the console panel 307. The controller 300 includes a CPU 301, a ROM 302, a RAM 303, an HDD 304, a network interface controller 305, and a panel controller 306. The CPU 301, the ROM 302, the RAM 303, the HDD 304, the network interface controller 305, and the panel controller 306 are interconnected via a bus 308.

The CPU 301 controls the overall operation of the communication apparatus 102 by executing software programs of the communication apparatus 102. The ROM 302 is a read only memory that stores a boot program, fixed parameters, and so forth, for the communication apparatus 102. The RAM 303 is a random access memory that is used as a temporary storage area for programs and a variety of data when the CPU 301 controls the communication apparatus 102. The HDD 304 is a hard disk drive and stores system software, applications, and a variety of data. The CPU 301 controls the operation of the communication apparatus 102 by executing the boot program stored in the ROM 302 and executing the programs stored in the HDD 304 and loaded into the RAM 303. The network interface controller 305 controls data communication with the MFP 101 and the like connected to the network 103. The touch panel-type console panel 307 is connected to the panel controller 306. The panel controller 306 controls the console panel 307. For example, the panel controller 306 displays a variety of information on the console panel 307 and further, acquires an instruction and the like input to the console panel 307 by a user from the console panel 307. Note that in the present embodiment, in place of the console panel 307, a keyboard, a mouse, a display, and so forth may be connected to the communication apparatus 102. According to this configuration, in the communication apparatus 102, the user inputs an instruction and the like to the communication apparatus 102 using the keyboard and the mouse, and a variety of information is displayed on the display.

Figure 4:
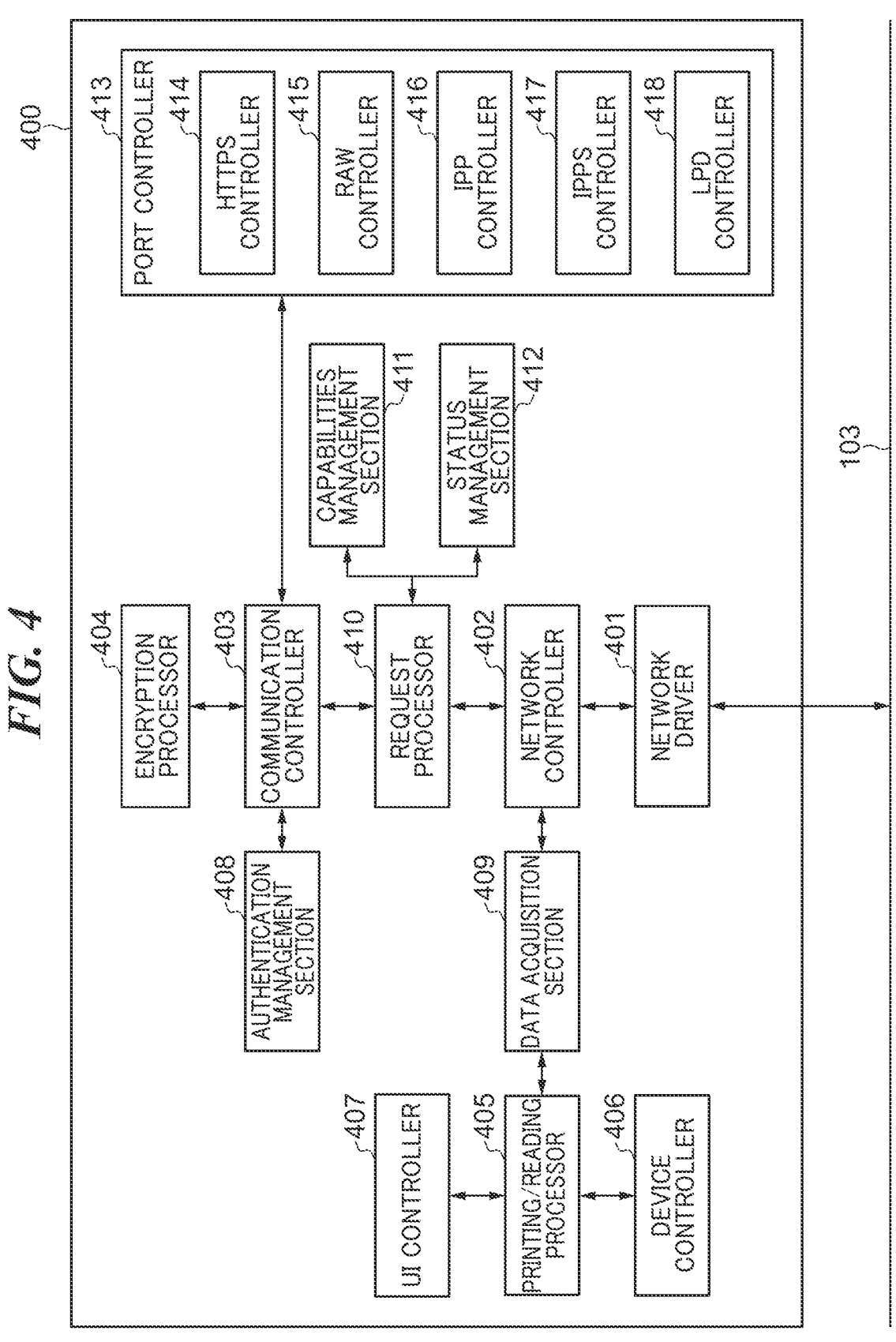
FIG. 4 is a schematic block diagram of a control module included in the MFP appearing in FIG. 1.

FIG. 4 is a schematic block diagram of a control module 400 included in the MFP 101 appearing in FIG. 1. The control module 400 is a software module stored in the ROM 202 or the HDD 204. Referring to FIG. 4, the control module 400 includes a network driver 401, a network controller 402, a communication controller 403, an encryption processor 404, a printing/reading processor 405, a device controller 406, a user interface controller 407, and an authentication management section 408. Further, the control module 400 includes a data acquisition section 409, a request processor 410, a capabilities management section 411, a status management section 412, and a port controller 413. Processing operations performed by the control module 400 are realized by the CPU 201 that executes programs loaded from the ROM 202 or the HDD 204 into the RAM 203.

The network driver 401 controls the network interface controller 205 to transmit and receive data to and from the communication apparatus 102 and the like connected via the network 103. The network controller 402 controls communication in a transport layer and layers below the transport layer of a network communication protocol, such as TCP/IP communication, to transmit and receive data. The communication controller 403 is a module for controlling a plurality of communication protocols supported by the MFP 101. The communication controller 403 controls the port controller 413 to open and block a network port for using a predetermined communication protocol. Note that although in the present embodiment, HTTPS will be described as the predetermined network communication protocol by way of example, encrypted communication, such as TLS communication, supported by the MFP 101 is also executed by the communication controller 403. Further, the communication controller 403 instructs the port controller 413 to switch software control in accordance with opening and closing of a network port.

The encryption processor 404 is a module for executing a variety of encryption processing operations. Examples of the variety of encryption processing operations include processing for encoding and decoding data, processing for generating and verifying an electronic signature, and processing for generating a hash value. Also in encrypted communication processing, such as TLS, which is executed by the communication controller 403, the encryption processing is performed by the encryption processor 404. The printing/reading processor 405 is a module for realizing the print function performed by the printer 211 and the document reading function performed by the scanner 210. The device controller 406 is a module for generating control commands and control data of the MFP 101 and performing centralized control of the MFP 101. The user interface controller 407 controls the console panel 212 and the panel controller 208.

The authentication management section 408 is a module for performing authentication of the communication apparatus 102 that performs communication via the network 103. The authentication management section 408 provides the data acquisition section 409 with the type of a job of which execution is requested by the communication apparatus 102 and connection destination information, according to commands (e.g. for PDL printing) received from the communication apparatus 102.

The data acquisition section 409 is a module for acquiring data from the communication apparatus 102 that performs communication via the network 103. Note that in the present embodiment, in a case where the network ports other than a predetermined network port are blocked, the data acquisition section 409 also accesses the communication apparatus 102 based on the information provided by the authentication management section 408, acquires data necessary for the control, and generates job data.

The request processor 410 is a module for interpreting a request received from the communication apparatus 102 and responding to the request. In a case where a received request concerns capabilities of the MFP 101, the request processor 410 acquires necessary information from the capabilities management section 411 and transmits the acquired information to the communication apparatus 102. Further, in a case where the received request concerns the apparatus status, the request processor 410 acquires necessary information from the status management section 412 and transmits the acquired information to the communication apparatus 102.

The capabilities management section 411 is a module for managing the capabilities of the MFP 101. The capabilities refer to functions of both of software and hardware, such as software functions (applications) which are available in the MFP 101 and functions of accessories (not shown) connected to the MFP 101. In the present embodiment, the capabilities management section 411 plays the role of managing a state of permission of use of each application, particularly depending on a ZT mode (predetermined operation mode). The ZT mode is a function of limiting a communicable network port, out of a plurality of network ports capable of receiving job data, only to a predetermined network port used by an application permitted to be used, and forcibly closing the other network ports. This makes it possible to receive only data from an external apparatus of which security is guaranteed by an SSL (TLS) certificate in advance. The MFP 101 is the most secure in a case where the number of predetermined network ports is 0, i.e. all network ports are blocked, and in the MFP 101 in a state thus configured, only functions which do not require communication with an external apparatus, such as a local copy function, are available. Note that in the present embodiment, the MFP 101 is provided with a plurality of network ports, including an HTTPS port, a RAW port, an IPP port, an IPPS port, and an LPD port. In the MFP 101, out of the plurality of network ports, the HTTPS port is set as the predetermined network port communicable in the ZT mode. In the following description, out of the plurality of network ports provided in the MFP 101, a predetermined network port used by an application permitted to be used, i.e. a predetermined network port communicable in the ZT mode is referred to as a "communication-permitted network port". Further, the other network ports are referred to as the "communication-restricted network ports".

Further, the capabilities management section 411 acquires and manages the capability information of another multifunction peripheral connected via the network 103. The capability information acquired from the other multifunction peripheral includes information indicating whether or not the other multifunction peripheral is compatible with the ZT mode and information indicating whether or not the ZT mode is set. The capability information of another multifunction peripheral may be acquired by a method in which the capability information is periodically transmitted from the other multifunction peripheral at a predetermined time, or by a method in which the request processor 410 inquires of the other multifunction peripheral about the capability information.

The status management section 412 is a module for managing the status of the MFP 101. The status includes a warning status, such as a state in which the remaining amount of sheets is small, an error status, such as a sheet jam, and the history of these statuses. For example, in a case where the status management section 412 receives an inquiry from the request processor 410 having received a print request, the status management section 412 responds about whether or not the MFP 101 is in a printable state. In the present embodiment, the status management section 412 stores an error status due to an attempt to use a function restricted by the ZT mode together with an error code (job termination code). Further, after a job is terminated, the status management section 412 sends a job termination code to the request processor 410, as a response to a job status confirmation request received from the communication apparatus 102.

The port controller 413 is a module group for controlling communication in the application layer and the like of the network communication protocol, such as TCP/IP communication, to realize the functions of the applications. The port controller 413 is comprised of an HTTPS controller 414 that controls the HTTPS port, a RAW controller 415 that controls the RAW port, an IPP controller 416 that controls the IPP port, an IPPS controller 417 that controls the IPPS port, and an LPD controller 418 that controls the LPD port. Note that the above-mentioned configuration of the port controller 413 is only an example, and the port controller 413 may include a controller associated with a network port other than these network ports.

Figure 5:
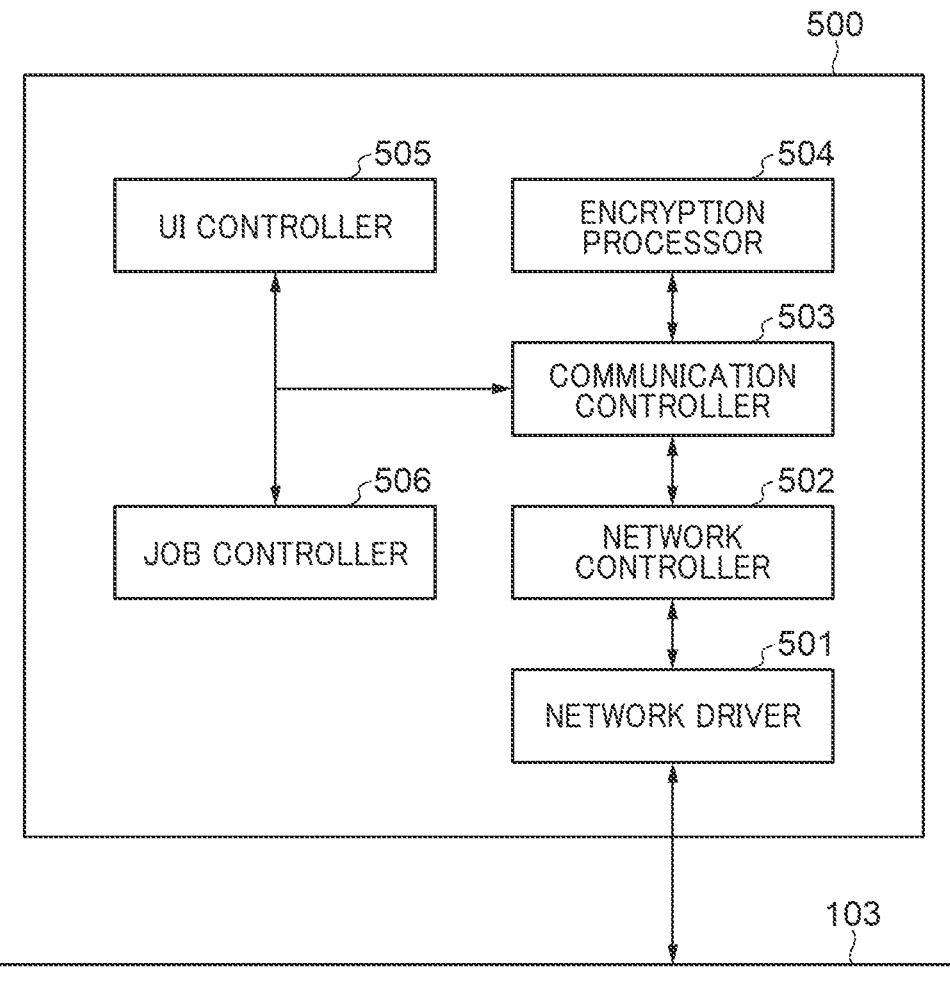
FIG. 5 is a schematic block diagram of a control module included in the communication apparatus appearing in FIG. 1.

FIG. 5 is a schematic block diagram of a control module 500 included in the communication apparatus 102 appearing in FIG. 1. The control module 500 is a software module stored in the ROM 302 or the HDD 304. Referring to FIG. 5, the control module 500 includes a network driver 501, a network controller 502, a communication controller 503, an encryption processor 504, a user interface controller 505, and a job controller 506. Processing operations performed by these modules are realized by the CPU 301 that executes programs loaded from the ROM 302 or the HDD 304 into the RAM 303.

The network driver 501 controls the network interface controller 305 to transmit and receive data to and from the MFP 101 connected via the network 103. The network controller 502 controls communication in the transport layer and layers below the transport layer of the network communication protocol, such as TCP/IP communication, to transmit and receive data. The communication controller 503 is a module for controlling a plurality of communication protocols supported by the communication apparatus 102. Encrypted communication, such as TLS, supported by the communication apparatus 102 is also executed by the communication controller 503.

The encryption processor 504 is a module for executing a variety of encryption processing operations. Examples of the variety of encryption processing operations include processing for encoding and decoding data, processing for generating and verifying an electronic signature, and processing for generating a hash value. Also in the encrypted communication, such as TLS communication, executed by the communication controller 503, the encryption processing is performed by the encryption processor 504. The user interface controller 505 controls the console panel 307 and the panel controller 306. The job controller 506 generates job data for executing a job according to an instruction input to the console panel 307 by a user and transmits the generated job data to the MFP 101 via the network 103.

Figure 6:
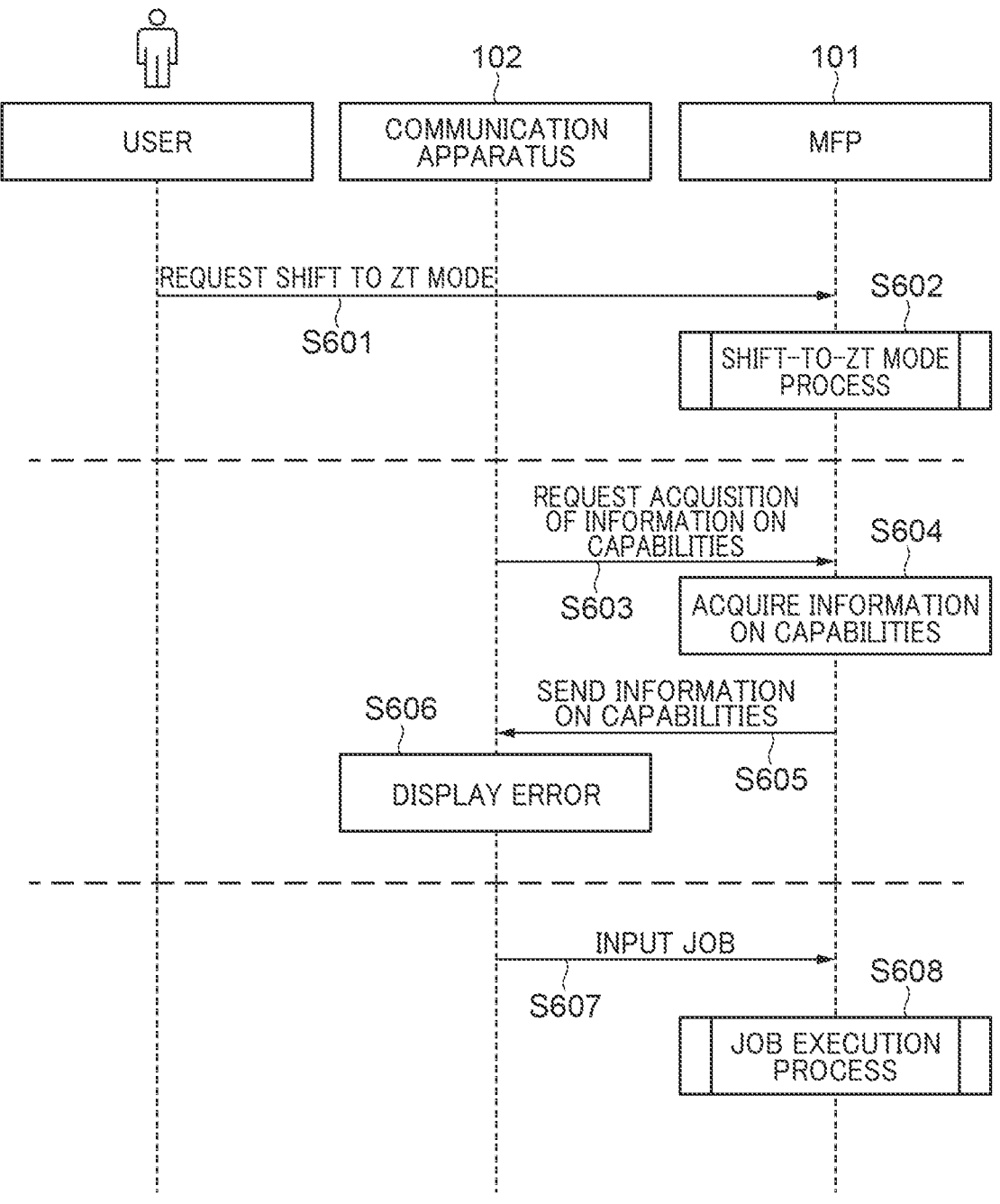
FIG. 6 is a sequence diagram useful in explaining a process related to a ZT mode, which is performed by the MFP appearing in FIG. 1.

FIG. 6 is a sequence diagram useful in explaining a process related to the ZT mode, which is performed by the MFP 101 appearing in FIG. 1.

Referring to FIG. 6, first, the MFP 101 receives a request for shifting to the ZT mode from a user (step S601). In the present embodiment, the user can instruct the MFP 101 to shift to the ZT mode by operating the console panel 212 of the MFP 101. Further, the user can also instruct the MFP 101 to shift to the ZT mode from a setting screen 700, shown in FIG. 7, displayed on the console panel 307 of the communication apparatus 102.

Figure 7:
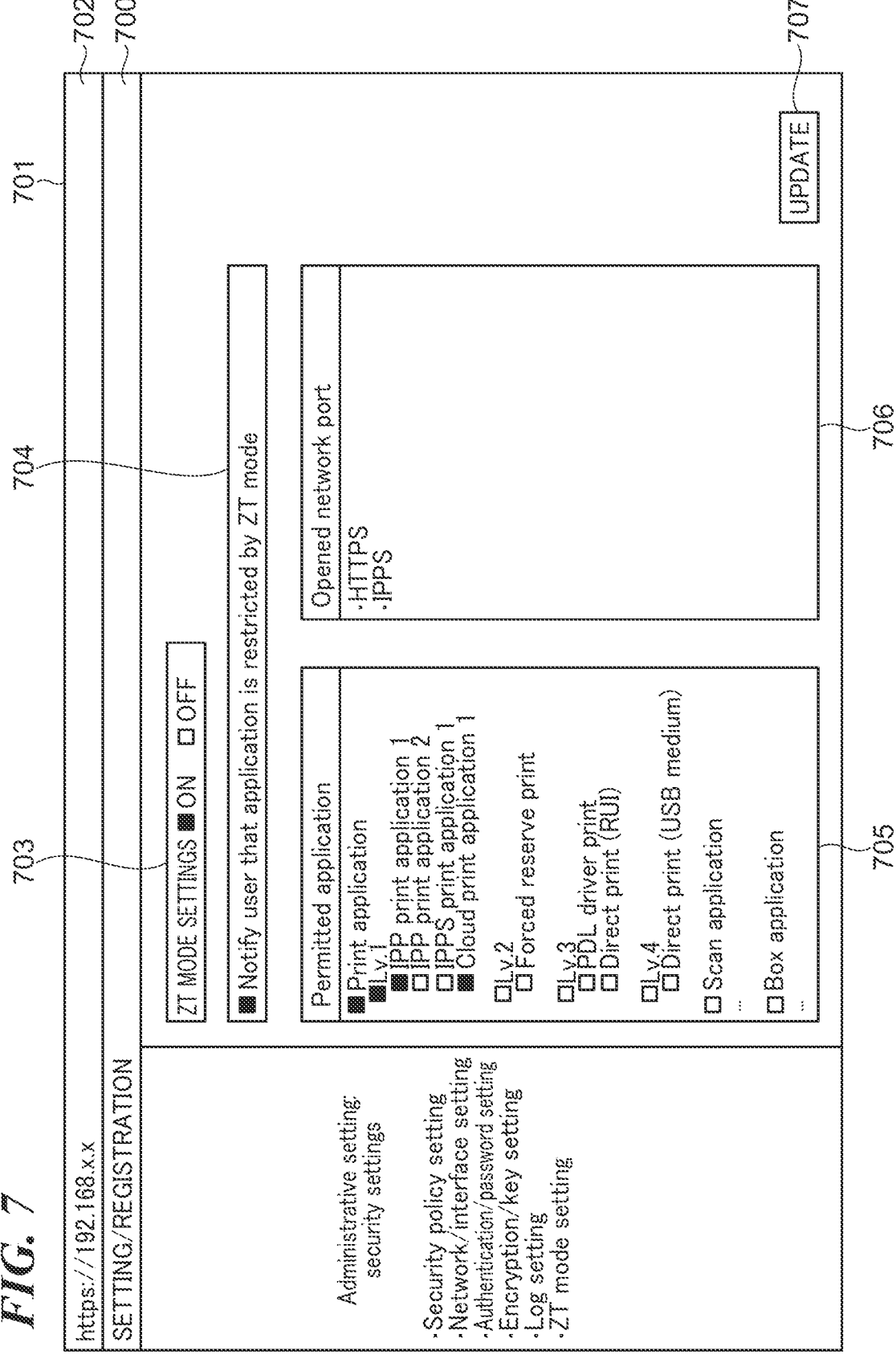
FIG. 7 is a diagram showing an example of a setting screen displayed on a console panel appearing in FIG. 3.

FIG. 7 is a diagram showing an example of the setting screen 700 displayed on the console panel 307 of the communication apparatus 102 appearing in FIG. 3. The setting screen 700 is a screen displayed on a web browser 701 of the communication apparatus 102 and is displayed based on the HTML acquired from the MFP 101 when the user inputs an IP address of the MFP 101 in an address bar 702 of the web browser 701. The setting screen 700 is a screen for configuring the settings of the ZT mode as some of the security settings of the MFP 101, which is a screen dedicated to an administrator of the MFP 101. The setting screen 700 includes a ZT mode setting selection area 703, a user notification selection area 704, a permitted application selection area 705, an opened network port display area 706, and an update button 707.

The ZT mode setting selection area 703 has two check boxes of "ON" and "OFF". The check box "ON" is a check box for enabling the ZT mode. The check box "OFF" is a check box for disabling the ZT mode. The user notification selection area 704 is an area which can be operated only in a case where the check box "ON" is selected in the ZT mode setting selection area 703. The user notification selection area 704 has one check box. When the user selects the update button 707 in a state in which the user has selected this check box, the communication apparatus 102 requests the MFP 101 to enable a ZT mode user notification function. The ZT mode user notification function is a function of notifying a user that the MFP 101 is set to the ZT mode and the use of applications is limited by the ZT mode.

The permitted application selection area 705 is an area for selecting an application to be permitted to be used in the ZT mode. In the permitted application selection area 705, it is possible to select any of a print application, a scan application, a box application, and so forth, which are functions requiring network communication, and thereby permit use of the selected application. Further, in the permitted application selection area 705, it is possible to permit use of each application stepwise according to e.g. a type of a communication protocol to be used. For example, the print applications available in the MFP 101 are managed as shown in FIG. 8.

FIG. 8 is a table showing a list of the print applications which are available in the MFP 101 appearing in FIG. 1. In the present embodiment, the print applications available in the MFP 101 are classified into levels each indicative of a category according to a type of the communication protocol to be used. An example of the print application classified into the level 1 is a cloud print application provided by the MFP 101 and an authenticated cloud. In a case where this application is selected in the permitted application selection area 705, the HTTPS port is opened. Further, examples of the print application classified into the level 1 are an IPP(S) print application provided as a standard function application by an operating system (OS) of an external apparatus, and a print application based on IPP-based IPP-Infra specification. In a case where any of these applications is selected in the permitted application selection area 705, not only the HTTPS port, but also the IPP port or the IPPS port is opened.

The print application classified into the level 2 is a print application used within the office security of an office, an in-house cloud, an on-premise server, and the like. Examples of this print application are a forced reserve print application for reserving print data in the communication apparatus 102 or the in-house cloud and printing the print data, and an on-premise print application that is operated by the MFP 101 in cooperation with the on-premise server. In a case where these applications are selected in the permitted application selection area 705, not only the HTTPS port, but also the RAW port is opened. In general, the RAW protocol is a non-secure print protocol, but its security is guaranteed by the office security.

The print application classified into the level 3 is a print application directly used by the MFP 101 and the communication apparatus 102 via the network 103. Examples of this print application are PDL driver print in which the communication apparatus 102 inputs binary data generated by a printer driver of the communication apparatus 102 to the MFP 101, and direct print in which the communication apparatus 102 inputs PDF or XPS data to the MFP 101 using an LPR command. Note that the PDF is an abbreviated form of Portable Document Format. The XPS is an abbreviated form of XML Paper Specification. In a case where the PDL driver print is selected in the permitted application selection area 705, the RAW port is opened. Further, in a case where the direct print is selected in the permitted application selection area 705, the HTTPS port and the LPD port are opened. Although the LPD protocol is a non-secure print protocol, similar to the RAW protocol, its security depends on an environment where the MFP 101 is installed.

The print application classified into the level 4 is a print application that performs printing by directly connecting the MFP 101 and a device, such as a USB device and a USB-HOST. In this print application, printing is performed by directly connecting e.g. a USB flash memory to the MFP 101 by a user, and hence whether or not to permit the use of the application is determined by the administrator of the MFP 101 according to the use thereof. Note that in the present embodiment, it is assumed that a check box associated with the cloud print application using the HTTPS port is selected by default in the permitted application selection area 705. In the opened network port display area 706, a communication-permitted network port is displayed. When the update button 707 is pressed in a state in which the check box "ON" is selected in the ZT mode setting selection area 703 on the setting screen 700, the communication apparatus 102 notifies the MFP 101 of a request for shifting to the ZT mode, including settings set on the setting screen 700.

Referring again to FIG. 6, the MFP 101 having received the request for shifting to the ZT mode executes a shift-to-ZT mode process described in detail below with reference to in FIG. 9 (step S602).

Figure 9:
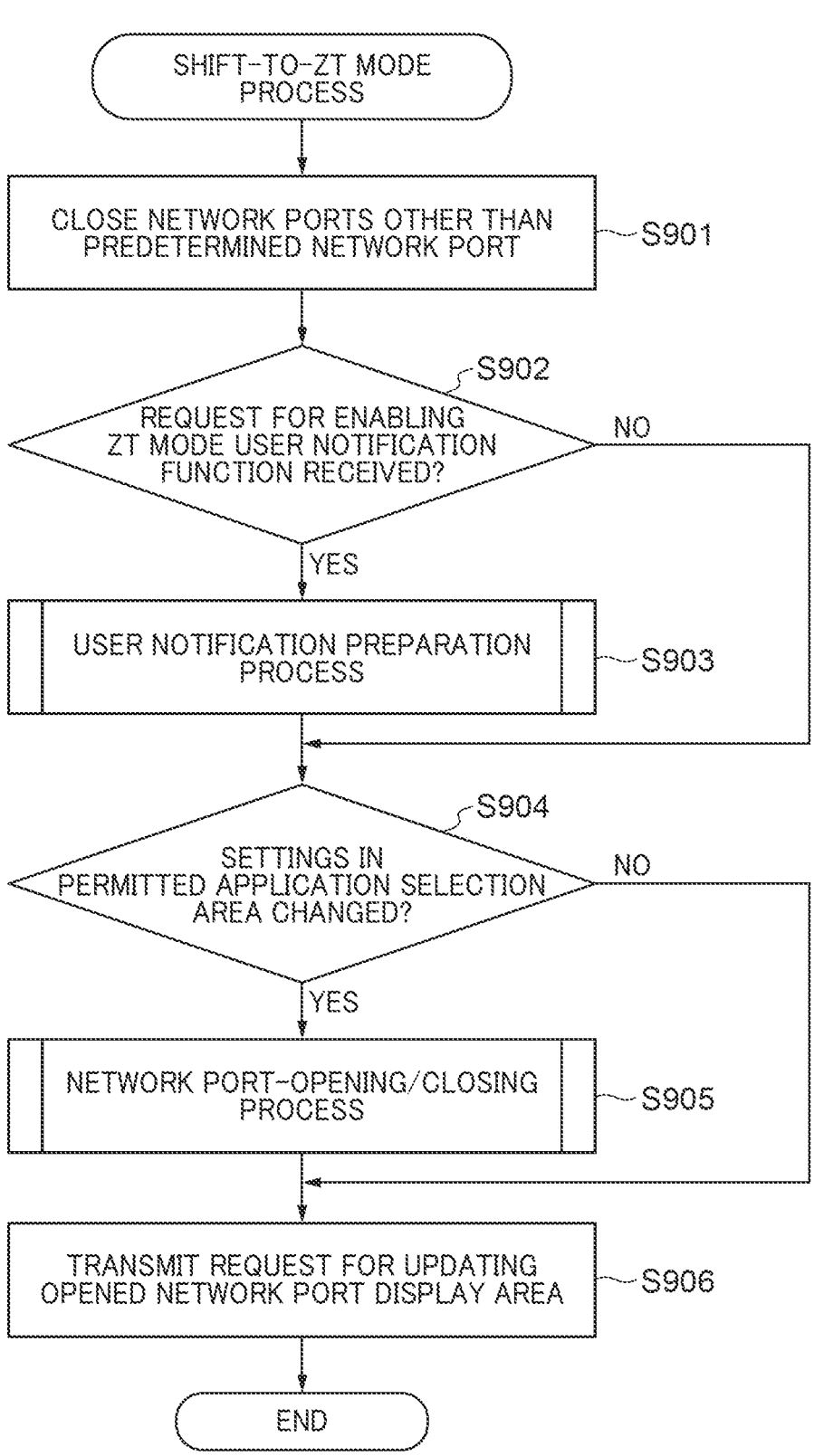
FIG. 9 is a flowchart of a process for shifting to a ZT mode, which is performed in a step in FIG. 6.

FIG. 9 is a flowchart of the shift-to-ZT mode process, which is performed in the step S602 in FIG. 6. The shift-to-ZT mode process in FIG. 9 is realized by the CPU 201 that executes a program loaded into the RAM 203. In the shift-to-ZT mode process in FIG. 9, it is assumed that the HTTPS port, the RAW port, the IPP port, the IPPS port, and the LPD port provided in the MFP 101 have been all opened. Further, it is assumed that the HTTPS controller 414, the RAW controller 415, the IPP controller 416, the IPPS controller 417, and the LPD controller 418 that control these ports, respectively, have been started in a normal mode. The controllers which have been started in the normal mode establish connection with the communication apparatus 102, and then perform processing for analyzing data transmitted from the communication apparatus 102.

Referring to FIG. 9, the CPU 201 controls the port controller 413 to block the network ports other than a predetermined network port, more specifically, the network ports other than the HTTPS port (step S901) (operation of a blocking control unit). Then, the CPU 201 determines whether or not a request for enabling the ZT mode user notification function is included in the received request for shifting to the ZT mode (step S902). In the present embodiment, as mentioned above, when the user selects the check box in the user notification selection area 704 on the setting screen 700, the request for enabling the ZT mode user notification function is included in the request for shifting to the ZT mode.

If it is determined in the step S902 that the request for enabling the ZT mode user notification function is not included in the received request for shifting to the ZT mode, the present process proceeds to a step S904, described hereinafter. If it is determined in the step S902 that the request for enabling the ZT mode user notification function is included in the received request for shifting to the ZT mode, the CPU 201 enables the ZT mode user notification function and performs a user notification preparation process described in detail below with reference to FIG. 10 (step S903).

Figure 10:
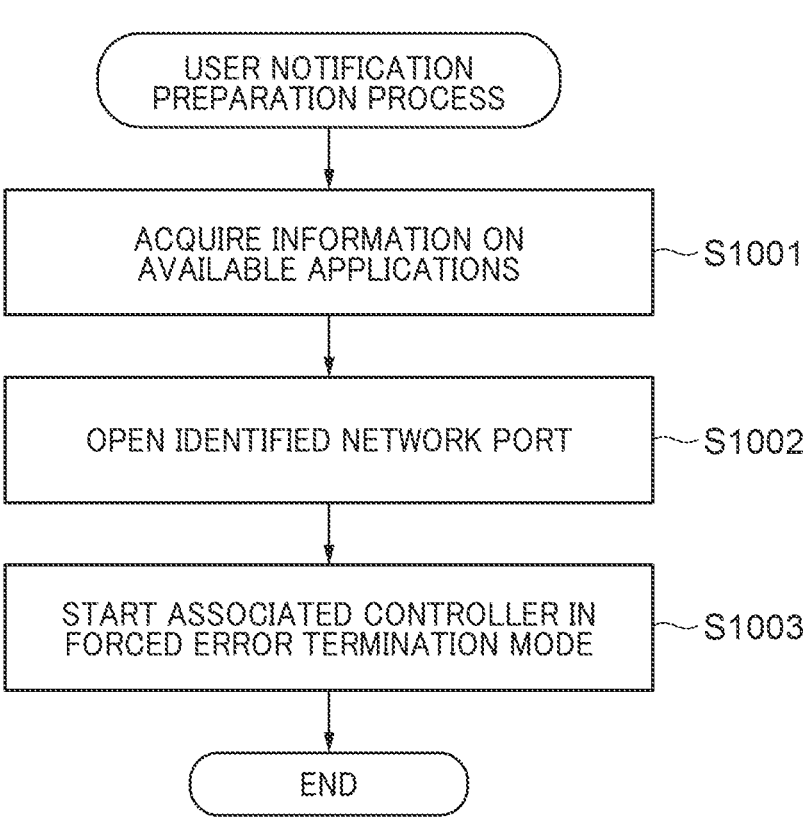
FIG. 10 is a flowchart of a user notification preparation process performed in a step in FIG. 9.

FIG. 10 is a flowchart of the user notification preparation process in the step S903 in FIG. 9.

Referring to FIG. 10, the CPU 201 acquires information on the applications available in the MFP 101 from the capabilities management section 411 (step S1001). This information includes information indicating the network ports used by the applications available in the MFP 101, more specifically, information indicating the HTTPS port, the RAW port, the IPP port, the IPPS port, and the LPD port.

Then, the CPU 201 identifies one network port out of the plurality of network ports (such as the RAW port, the IPP port, the IPPS port, and the LPD port) except the predetermined network port (e.g. the HTTPS port) based on the information acquired in the step S1001. Then, the CPU 201 opens the identified network port (step S1002) (operation of an opening control unit). Then, the CPU 201 starts a controller that controls the identified network port in a forced error termination mode (step S1003). The forced error termination mode is a mode for forcibly terminating a job as an error without analyzing data transmitted from the communication apparatus 102 after the above-mentioned controller establishes connection with the communication apparatus 102 which is the requesting source. With this, the job data transmitted from the communication apparatus 102 to the network port controlled by the above-mentioned controller is discarded without being interpreted by the MFP 101, and a job termination code, described hereinafter, is stored in the MFP 101 as a record indicating the error termination.

Then, the CPU 201 identifies a network port next to the network port identified in the step S1001 out of the plurality of network ports except the predetermined network port based on the information acquired in the step S1001 and returns to the step S1002. Thus, in the present embodiment, the steps S1002 and S1003 are executed with respect to all network ports except the predetermined network port in the information acquired in the step S1001. With this, the RAW port, the IPP port, the IPPS port, and the LPD port except the HTTPS port as the predetermined network port are opened. Further, the RAW controller 415, the IPP controller 416, the IPPS controller 417, and the LPD controller 418 that control the opened network ports, respectively, are started in the forced error termination mode. After that, the user notification preparation process is terminated, and the CPU 201 executes the step S904 in FIG. 9.

In the step S904, the CPU 201 determines whether or not there is a change in the settings in the permitted application selection area 705. In the present embodiment, as mentioned above, the check box associated with the cloud print application using the HTTPS port is selected by default. For example, in a case where another check box other than the check box selected by default is newly selected in the permitted application selection area 705, or in a case where the check box selected by default is changed to a non-selected state, the CPU 201 determines that there is a change in the settings in the permitted application selection area 705. On the other hand, if none of the above-mentioned cases apply, the CPU 201 determines that there is no change in the settings in the permitted application selection area 705.

If it is determined in the step S904 that there is no change in the settings in the permitted application selection area 705, the present process proceeds to a step S906, described hereinafter. If it is determined in the step S904 that there is a change in the settings in the permitted application selection area 705, the CPU 201 executes a network port-opening/closing process, described in detail below with reference to FIG. 11, (step S905).

FIG. 11 is a flowchart of the network port-opening/closing process performed in the step S905 in FIG. 9.

Referring to FIG. 11, the CPU 201 determines whether or not the ZT mode user notification function is enabled (step S1101). If it is determined in the step S1101 that the ZT mode user notification function is enabled, the present proceeds to a step S1102. In the step S1102, the CPU 201 determines whether or not any check box other than the check box selected by default has been newly selected in the permitted application selection area 705.

If it is determined in the step S1102 that any check box other than the check box selected by default has been newly selected in the permitted application selection area 705, the present process proceeds to a step S1103. In the step S1103, the CPU 201 starts each controller that controls a network port used by an application associated with the associated newly selected check box, in the normal mode. Thus, in the present embodiment, the controller that controls the network port(s) used by the application(s) selected in the permitted application selection area 705 is/are started in the normal mode, and the network communication via the corresponding network port(s) is enabled. After that, the network port-opening/closing process is terminated.

It is determined that there is a change in the settings in the permitted application selection area 705, in either of the case where any check box other than the check box selected by default is newly selected or the case where the check box selected by default is changed to a non-selected state, and hence if it is determined in the step S1102 that no check box other than the check box selected by default has been newly selected in the permitted application selection area 705, this means that the check box selected by default has been changed to the non-selected state. In this case, the CPU 201 starts the controller that controls the network port used by the application associated with the check box which has been changed to the non-selected state, more specifically, the HTTPS controller 414, in the forced error termination mode (step S1104). After that, the network port-opening/closing process is terminated.

If it is determined in the step S1101 that the ZT mode user notification function is not enabled, the present process proceeds to a step S1105. In the step S1105, the CPU 201 determines whether or not any check box other than the check box selected by default has been newly selected in the permitted application selection area 705.

If it is determined in the step S1105 that any check box other than the check box selected by default has been newly selected in the permitted application selection area 705, the present process proceeds to a step S1106. In the step S1106, the CPU 201 opens a network port or network pots used by an application or applications associated with the selected check box(es) (step S1106). After that, the network port-opening/closing process is terminated.

If it is determined in the step S1105 that no check box other than the check box selected by default has been newly selected in the permitted application selection area 705, this means that the check box selected by default has been changed to the non-selected state, for the above-mentioned reason. In this case, the CPU 201 blocks the network port used by the application associated with the check box which has been changed to the non-selected state, more specifically, the HTTPS port (step S1107). After that, the network port-opening/closing process is terminated, and the CPU 201 executes the step S906 in FIG. 9.

In the step S906, the CPU 201 requests the communication apparatus 102 to update the opened network port display area 706 (step S906). More specifically, the CPU 201 transmits an update request which is an instruction for displaying a communication-permitted network port or communication-permitted network ports, out of the plurality of network ports provided in the MFP 101, in the opened network port display area 706. The communication-permitted network port(s) is/are an opened network port or opened network ports, which is/are a network port or network ports, the controller(s) of which has/have been started in the normal mode. The communication apparatus 102 having received the update request updates the display contents in the opened network port display area 706. With this, out of the plurality of network ports provided in the MFP 101, the network port(s) enabled to perform network communication with the communication apparatus 102 is/are displayed in the opened network port display area 706. After that, the shift-to-ZT mode process is terminated. Thus, in the present embodiment, only the communication-permitted network port(s) out of the plurality of network ports provided in the MFP 101 is/are enabled to perform network communication with an external apparatus.

Next, a sequence performed when the MFP 101 receives a capability acquisition request from the communication apparatus 102 will be described. As shown in FIG. 6, when the MFP 101 receives a capability acquisition request from the communication apparatus 102 (step S603), the MFP 101 acquires the capability information from the capabilities management section 411 (step S604). The capability information includes, for example, the applications which are available in the MFP 101, the information on the application(s) permitted to be used in the step S602, the information indicating whether or not the MFP 101 is in the ZT mode, and the information indicating whether or not any other MFP connected to the network 103 is in the ZT mode. Then, the MFP 101 transmits a response about the capabilities to the communication apparatus 102 based on the acquired capability information (step S605). For example, when the MFP 101 in the ZT mode permits the use of the IPP print application and the cloud print application in the step S602, only the HTTPS port and the IPPS port in the MFP 101, which are used by these applications, are enabled to perform network communication. That is, the network communication using the network ports other than these is disabled, and hence the MFP 101 transmits the response about the capabilities, including e.g. the information indicating the MFP 101 is in the ZT mode and the information indicating that printing using the printer driver is disabled, to the communication apparatus 102.

The communication apparatus 102 displays an error message on the console panel 307 based on the received response about the capabilities (step S606). In the step S606, for example, the communication apparatus 102 displays a message to the effect that printing using the printer driver is disabled due to the ZT mode, on the console panel 307. Note that in the present embodiment, the communication apparatus 102 may control the display so as not to display the MFP 101 as an apparatus capable of performing printing using the printer driver, without displaying the error message in the step S606. Further, the communication apparatus 102 may acquire the information on the applications permitted to be used in the step S602 from the response about the capabilities, and display a notification for prompting the user to use another print application based on this information, on the console panel 307. Further, the communication apparatus 102 may acquire the information indicating whether or not the other MFP(s) connected to the network 103 is/are in the ZT mode from the response about the capabilities, display information indicating an MFP or MFPs capable of performing printing using the printer driver, on the console panel 307, based on this information, and display a notification prompting the user to change the apparatus (input destination apparatus) to which a print job is to be input, on the console panel 307.

Next, a sequence performed when a job is input from the communication apparatus 102 to the MFP 101 in the ZT mode will be described. As shown in FIG. 6, when a job is input from the communication apparatus 102 (step S607), the MFP 101 performs a job execution process described in detail below with reference to FIG. 12 (step S608).

Figure 12:
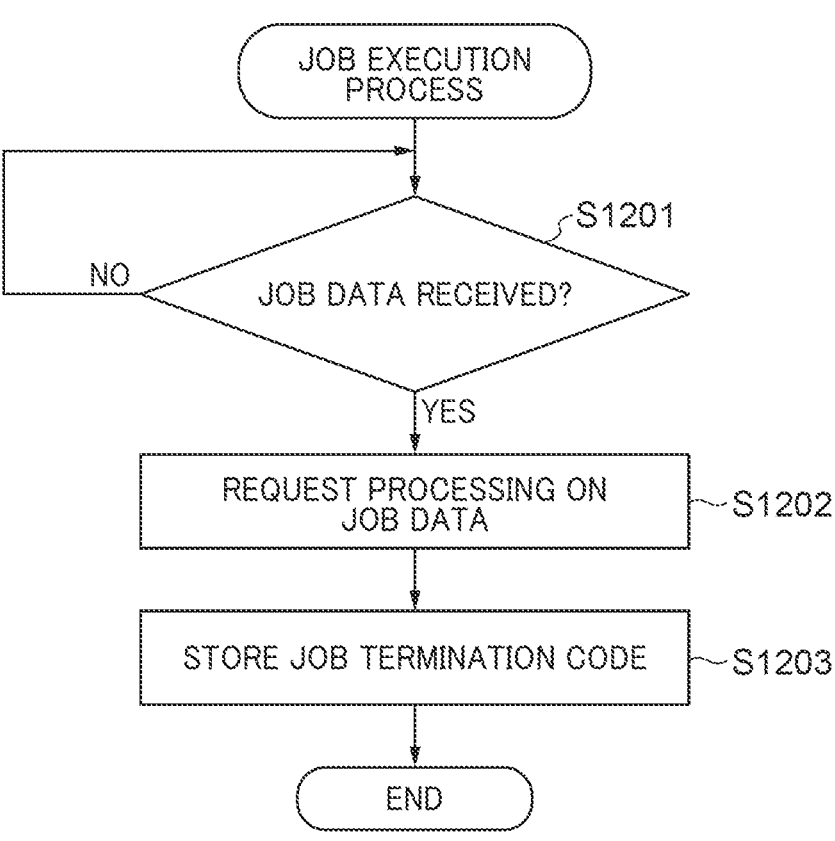
FIG. 12 is a flowchart of a job execution process performed in a step in FIG. 6.

FIG. 12 is a flowchart of the job execution process performed in the step S608 in FIG. 6. The job execution process in FIG. 12 is realized by the CPU 201 that executes a program loaded into the RAM 203. Note that in the job execution process in FIG. 12, it is assumed that the above-described shift-to-ZT mode process has already been executed.

Referring to FIG. 12, the CPU 201 remains on standby until job data is received from an external apparatus. When job data is received from an external apparatus, e.g. the communication apparatus 102 (YES to a step S1201), the CPU 201 causes the request processor 410 to request the port controller 413 to perform processing of the received job data (step S1202). The port controller 413 processes the received job data. In the present embodiment, details of the processing are different depending on the application (input destination application) to which the job data is input. The following description will be given of a case where, out of the plurality of controllers forming the port controller 413, only the HTTPS controller 414 has been started in the normal mode and the other controllers have been started in the forced error termination mode. For example, in a case where the input destination application of the job is a print application using the HTTPS port, the HTTPS controller 414 of the port controller 413 executes processing for analyzing the received job data to extract print data. The printing/reading processor 405 and the device controller 406 execute print processing based on the extracted print data. When the job is normally terminated, the printing/reading processor 405 outputs a job termination code indicating that the job has been normally terminated.

On the other hand, in a case where the input destination application of the job is a print application using the RAW port, the RAW controller 415 of the port controller 413 discards this job data without executing processing for analyzing the received job data, terminates the job as an error, and outputs a job termination code indicating that the job has been terminated in an error due to the ZT mode. Then, the CPU 201 stores the output job termination code in the ROM 202 or the HDD 204 in association with the job history forming the execution history of the executed job (step S1203), followed by terminating the present process. After the job execution process is terminated, the user can view the above-mentioned job history by operating the console panel 212.

Figure 13:
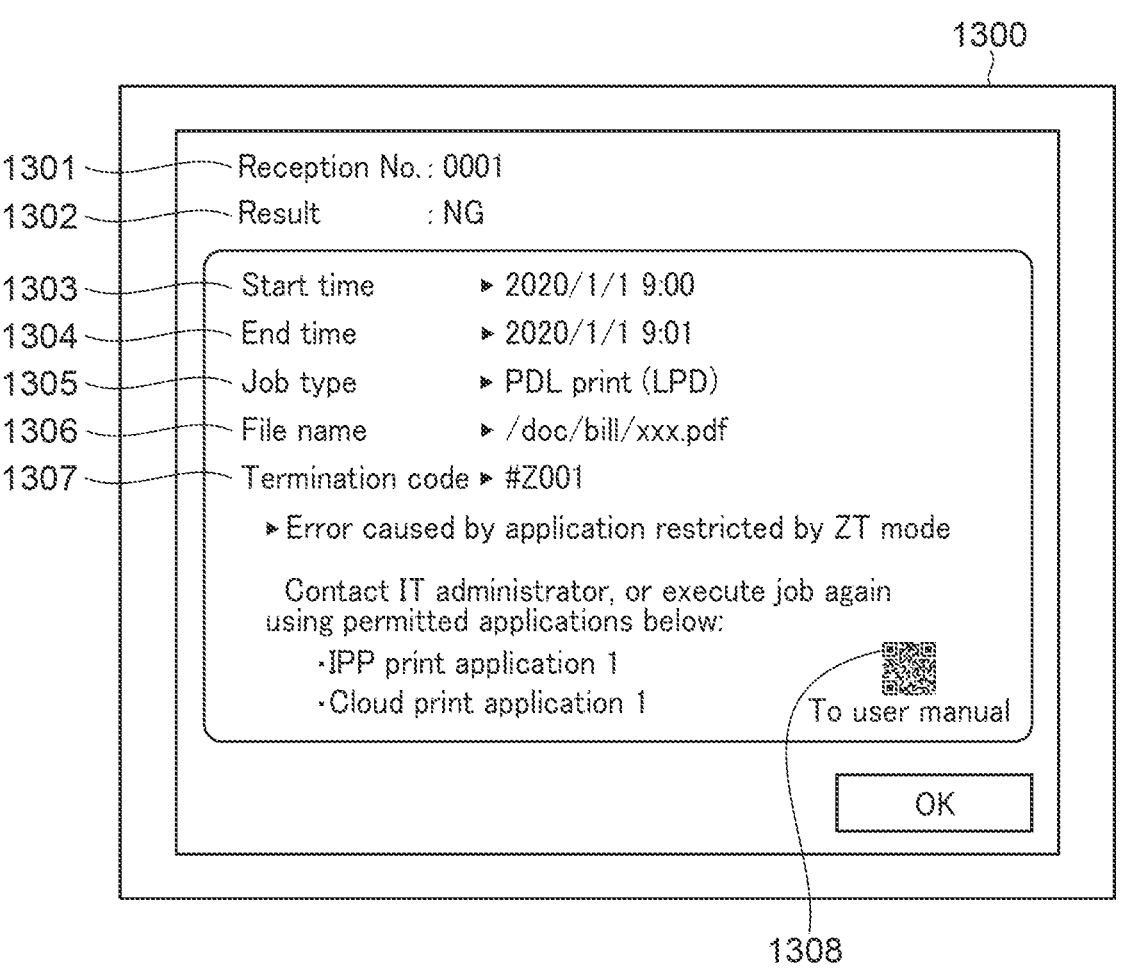
FIG. 13 is a diagram showing an example of a job history screen displayed on a console panel appearing in FIG. 2.

FIG. 13 is a diagram showing an example of a job history screen 1300 displayed on the console panel 212 appearing in FIG. 2. The job history screen 1300 includes a reception number 1301, a result 1302, a start time 1303, an end time 1304, a job type 1305, a file name 1306, and a termination code 1307.

The reception number 1301 displays a serial number assigned to a job when the job is received. The result 1302 displays OK or NG indicating that the job has been normally terminated or not. The start time 1303 and the end time 1304 display the start time and the end time of the job, respectively. The job type 1305 displays a type of the job. In the illustrated example in FIG. 13, "PDL print (LPD)" indicating that the job is a print job for the PDL port is displayed. The file name 1306 displays a job name. The termination code 1307 displays a job termination code output when the job is terminated in an error. In the illustrated example in FIG. 13, "#Z001" which is a job termination code indicating that the job has been terminated in an error due to the ZT mode is displayed, and the contents of the error indicated by the job termination code are displayed below the code. Further, as error avoiding means, a message for prompting the administrator to set the application as a permitted application or a message for prompting the administrator to use an application which has already been permitted to be used is displayed. Further, an object for displaying user manuals about a method of using the application which has already been permitted, such as a hyperlink or a QR code (registered trademark) 1308, is displayed. Note that in the present embodiment, the information on the job history including the job termination code is managed by the status management section 412. The MFP 101 transmits the information on the job history to the communication apparatus 102 as a response to a state acquisition request received from the communication apparatus 102. The communication apparatus 102 can display the received information on the job history on the console panel 307. With this, the user can grasp a job execution status, a cause of an error, and so forth, from the communication apparatus 102.

According to the above-described embodiment, when a communication-restricted network port which has been blocked is opened and job data is received via the opened communication-restricted network port, a job termination code indicating that the job is terminated in an error due to the ZT mode is output, and the output job termination code is notified. This makes it possible to notify a user that the error is caused due to the ZT mode.

Further, in the above-described embodiment, the controller that controls the communication-restricted network port having received job data outputs the job termination code. With this, it is possible to easily output the job termination code when the communication-restricted network port receives job data.

Further, in the above-described embodiment, the controller that controls the communication-restricted network port having received job data outputs the job termination code without analyzing the received job data. With this, it is possible to reduce a risk, such as virus infection caused by reading job data transmitted via a non-secure path, while notifying a user that the error is caused due to the ZT mode.

In the above-described embodiment, the job termination code is displayed on the console panel 212 of the MFP 101.

This makes it possible to notify a user who is waiting for a printed matter to be output from the MFP 101 that an error is caused due to the ZT mode.

Further, in the above-described embodiment, the contents of an error indicated by the job termination code are displayed on the console panel 212 of the MFP 101. This makes it possible to notify the user who is waiting for a printed matter to be output from the MFP 101 of the details of the error.

In the above-described embodiment, a message for prompting the user to use an application using a communication-permitted network port is displayed on the console panel 212 of the MFP 101. This makes it possible to notify the user of an application available in the ZT mode.

In the above-described embodiment, the user manuals about the method of using an application using a communication-permitted network port are displayed on the console panel 212 of the MFP 101. This makes it possible to notify a user of the method of using an application available in the ZT mode.

Further, in the above-described embodiment, the job termination code is transmitted to the communication apparatus 102 having transmitted a job termination code acquisition request. This makes it possible to notify a user who is operating the communication apparatus 102 having transmitted job data that an error is caused due to the ZT mode.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-074063, filed Apr. 26, 2021, which is hereby incorporated by reference herein in its entirety.

What is claimed is:

1. An image forming apparatus comprising:

a display;

a controller that receives a selection of one or more applications among a plurality of applications in a communication apparatus for which usage is to be permitted in a second operation mode of the image forming apparatus;

a network interface controller that receives a request for shifting the image forming apparatus to the second operation mode from a first operation mode, wherein:

the first operation mode is where the image forming apparatus performs a print job received, using an application among the plurality of applications in the communication apparatus and a network port from among a plurality of network ports available in the image forming apparatus, from the communication apparatus, and the second operation mode is:

a Zero Trust (ZT) mode;

where the image forming apparatus performs the print job received, using the selected one or more applications in the communication apparatus and a predetermined network port different from the network port used in the first operation mode from among the plurality of network ports, from the information processing communication apparatus; and where the image forming apparatus invalidates the network port used in the first operation mode; and does not receive, as a result of the invalidation of the network port, the print job transmitted by an application, among the plurality of applications in the communication apparatus, different from the selected one or more applications using the network port, from the communication apparatus; and wherein the controller controls the display to display error information for the print job, the print job being transmitted by the application different from the selected one or more applications using the network port in a state where the image forming apparatus is in the second operation mode, wherein the displayed error information includes:

first information indicating that the print job is not performed and identifying the network port used in the transmission of the print mob;

second information prompting a user to use the selected one or more applications for transmitting a print job using the predetermined network port;

third information indicating an error occurred due to an application restricted by the ZT mode; and a QR code for displaying a user manual indicating a usage of the selected one or more applications, wherein the controller controls the display to display the first information in a state where the second information, the third information, and the QR code are displayed on the display.

2. The image forming apparatus according to claim 1, wherein the predetermined network port is one of an HTTPS port, an HTTP port, an IPPS port, an IPP port, a RAW port, or an LPD port.

3. The image forming apparatus according to claim 1, wherein the second operation mode is where the ZT mode is valid and a setting for notifying the communication apparatus of displaying the error information is set.

4. A method of controlling an image forming apparatus including a network interface controller and a display, the method comprising:

receiving a selection of one or more applications among a plurality of applications in a communication apparatus for which usage is to be permitted in a second operation mode of the image forming apparatus;

receiving, via the network interface controller, a request for shifting the image forming apparatus to the second operation mode from a first operation mode, wherein: the first operation mode is where the image forming apparatus performs a print job received, using an application among the plurality of applications in the communication apparatus and a network port from among a plurality of network ports available in the image forming apparatus, from the communication apparatus, and the second operation mode is:

a Zero Trust (ZT) mode;

where the image forming apparatus performs the print job received, using the selected one or more applications in the communication apparatus and a predetermined network port different from the network port used in the first operation mode from among the plurality of network ports, from the communication apparatus; and where the image forming apparatus invalidates the network port used in the first operation mode; and does not receive, as a result of the invalidation of the network port, the print job, transmitted by an application among the plurality of applications in the communication apparatus, different from the selected one or more applications using the network port, from the information processing communication apparatus; and controlling the display to display error information for the print job, the print mob being transmitted by the application different from the selected one or more applications using the network port in a state where the image forming apparatus is in the second operation mode, wherein the displayed error information includes:

first information indicating that the print job is not performed and identifying the network port used in the transmission of the print mob; second information prompting a user to use the selected one or more applications for transmitting a print job using the predetermined network port;

third information indicating an error occurred due to an application restricted by the ZT mode; and a QR code for displaying a user manual indicating a usage of the selected one or more applications, wherein the controlling controls the display to display the first information in a state where the second information, the third information, and the QR code are displayed on the display.

5. A non-transitory computer-readable storage medium storing a program executable by a computer to execute a method of controlling an image forming apparatus including a network interface controller and a display, the method comprising:

receiving a selection of one or more applications among a plurality of applications in a communication apparatus for which usage is to be permitted in a second operation mode of the image forming apparatus;

receiving, via the network interface controller, a request for shifting the image forming apparatus to the second operation mode from a first operation mode, wherein:

the first operation mode is where the image forming apparatus performs a print job received, using an application among the plurality of applications in the communication apparatus and a network port from among a plurality of network ports available in the image forming apparatus, from the communication apparatus, and the second operation mode is:

a Zero Trust (ZT) mode;

where the image forming apparatus is configured to performs the print job received, using the selected one or more applications in the communication apparatus and a predetermined network port different from the network port used in the first operation mode from among the plurality of network ports, from the communication apparatus; and where the image forming apparatus invalidates the network port used in the first operation mode; and does not perform receive, as a result of the invalidation of the network port, the print job received, transmitted by an application, among the plurality of applications in the communication apparatus, different from the selected one or more applications using the network port, from the communication apparatus; and controlling the display to display error information for the print job, the print job being transmitted by the application different from the selected one or more applications using the network port in a state where the image forming apparatus is in the second operation mode, wherein the displayed error information includes:

first information indicating that the print job is not performed and identifying the network port used in the transmission of the print mob;

second information prompting a user to use the selected one or more applications for transmitting a print job using the predetermined network port;

third information indicating an error occurred due to an application restricted by the ZT mode; and a QR code for displaying a user manual indicating a usage of the selected one or more applications, wherein the controlling controls the display to display the first information is displayed in a state where the second information, the third information, and the QR code are displayed on the display.

\* \* \* \* \*